O. OHLSON.
COMPOSITE MACHINE ELEMENT.
APPLICATION FILED AUG. 22, 1916.
1,265,811.
Patented May 14, 1918.
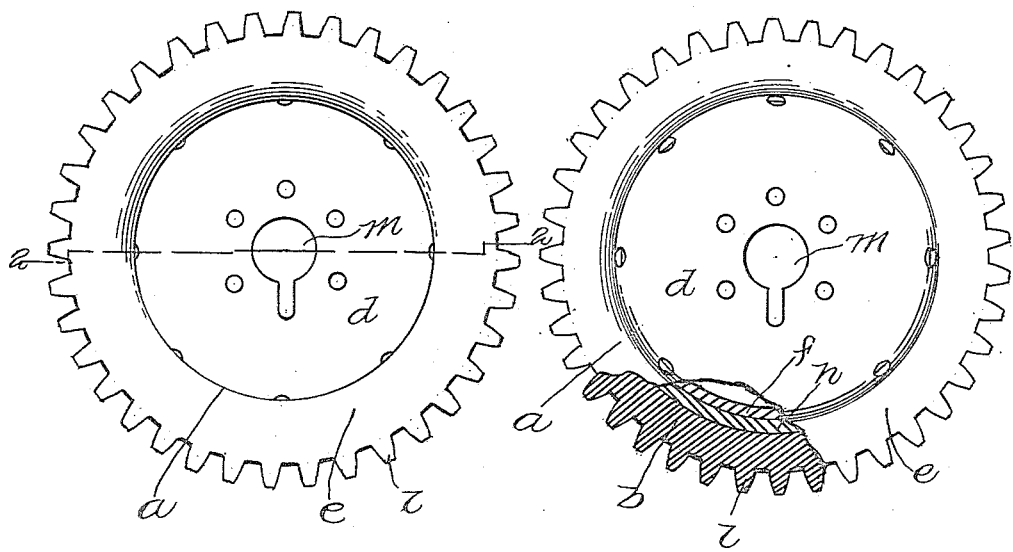
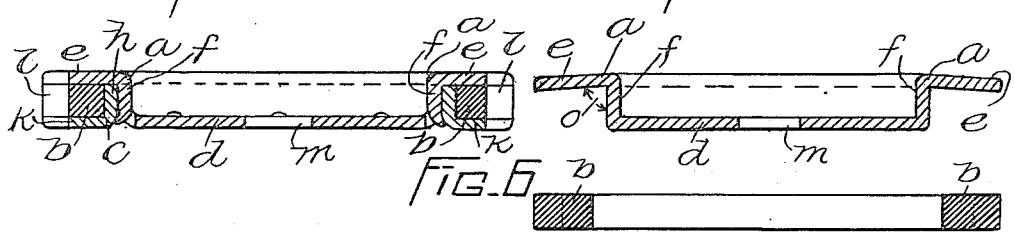
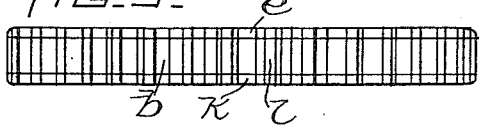
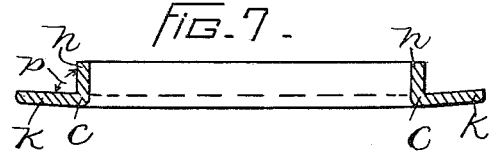
INVENTOR:
OLOF OHLSON
ATT'YS.

UNITED STATES PATENT OFFICE.

OLOF OHLSON, OF NEWTON, MASSACHUSETTS, ASSIGNOR TO WALTHAM WATCH COMPANY, OF WALTHAM, MASSACHUSETTS, A CORPORATION OF MASSACHUSETTS.

COMPOSITE MACHINE ELEMENT.

1,265,811.

Specification of Letters Patent.

Patented May 14, 1918.

Application filed August 22, 1916. Serial No. 116,366.

*To all whom it may concern:*

Be it known that I, OLOF OHLSON, a citizen of the United States, residing at Newton, in the county of Middlesex and State of Massachusetts, have invented new and useful Improvements in Composite Machine Elements, of which the following is a specification.

The present invention relates to machine elements and particularly to gears and motion transmitting elements having similar characteristics. The object of the invention is to furnish a gear or similar element having a composite structure by virtue of which the noise occasioned by its running in mesh, or in other mode of coöperation, with a complemental motion transmitting element, is reduced; and one which is also strong and durable, but at the same time of simple construction, and may be produced at low cost.

In the drawing forming a part of this application I have illustrated the embodiment of my invention in the form of a spur gear, that being the particular machine element in respect to which the principles of my invention have their greatest utility, but I desire it to be understood that I do not limit the invention to a spur gear rather than to bevel and crown gears of either regular or distorted form, or even to the type of machine element having teeth which is ordinarily designated by the term "gear," but I include also within my invention the application of the principles hereinafter described in detail to other types of machine elements as well, such as friction disks or wheels, cams, and indeed any element or article in which the principles and essential features herein disclosed may be applied.

In the drawings,

Figure 1 is a face view of a spur gear in which my invention is embodied.

Fig. 2 is a sectional view on line 2—2 of Fig. 1.

Fig. 3 is an elevation showing the gear edgewise.

Fig. 4 is a face view similar to Fig. 1, but partly broken away to illustrate the features of construction which are concealed in Fig. 1.

Figs. 5, 6, and 7 are sectional views similar to Fig. 2 of the several parts of the gear separated from one another.

The parts of the gear comprise a disk $a$, a ring $b$, and a binding ring or washer $c$.

The disk $a$ is offset at its central part in such a way that such central part forms a web $d$ in a plane at one side of and approximately parallel to the plane of the lip or flange $e$ at the outer portion of the disk. Such lip and flange are connected by a substantially cylindrical wall $f$. The washer $c$ is sharply bent between its inner and outer circumferences to produce a substantially cylindrical wall $h$ and an outwardly extending flange or lip $k$.

The disk and washer are made of material sufficiently hard to withstand wear, sufficiently stiff to oppose great resistance to distortion, and sufficiently elastic and resilient to permit some distortion without acquiring a permanent set. Metals possess these qualities in a higher degree than other materials, and of the metals steel possesses such qualities in the highest degree. Accordingly I prefer to employ steel as the material from which the disk and washer are made. I further prefer to make these parts out of plates or sheets having such thickness in proportion to the diameter or width of the article to be produced that they may be offset into forms described by means of dies, and also be stiff enough for the service required. I do not exclude from the protection of my claims elements having the parts herein above described which have have been formed by forging or cutting, but the method of forming such parts by pressure from sheet or plate stock is so much more economical than other methods of production that I prefer it. For this purpose the metal must be sufficiently ductile to allow blanks cut from relatively thick stock to be sharply bent and offset in the manner indicated. The material of which the ring $b$ is made is such as to deaden sound vibrations to the highest possible degree. The material best suited for that purpose of which I have knowledge is hard compressed fiber, and such is the material which I have used. I do not, however, limit this feature of the invention to hard fiber, but include within the scope of my protection any material having greater capacity for deadening sound than have the metals which are sufficiently hard for machine elements.

In assembling the parts above described, the ring $b$ is first slipped over the cylindrical wall $h$ of the washer $c$. Preferably the inner diameter of the ring is made to approximate so closely the outer diameter of the wall $h$ that powerful pressure is required to force the one on the other, and that when assembled they are firmly connected by friction. Also the inner diameter of the wall $h$ is made to approximate so closely the outer diameter of the wall $f$ that powerful pressure is required to pass the former over the latter. After the ring has been assembled with the washer, the latter is passed over the cylindrical wall $f$ of the disk. The three members are then so firmly secured together by friction between their concentric surfaces that any movement of one relatively to the other by the forces to which they are subjected in use, which would tend to cause such relative movement, is impossible.

The composite element made of the members constructed and assembled as above described, is then finished on its outer periphery appropriately to the surface to which it is designed to conform. When such surface is that of a gear, teeth $l$ are cut in the periphery, as shown in the drawings.

The teeth so cut are of composite construction, each consisting of a central part of sound-deadening material such as fiber, and end portions of hard wear-resisting material such as steel. This construction causes the gear to run more quietly in mesh with the complemental gear than would an all metal gear, while its wear-resisting property is substantially as great as of the all metal gear.

A hole $m$ is made in the center of the web $d$ to permit of the gear being mounted on a shaft.

In forming the disk and washer, the lip portions thereof are not formed exactly at right angles to their axes but are made somewhat conical, so that the angle $o$ between the lip $e$ and the wall $f$ of the disk is an acute angle and the angle $p$ between the lip $k$ and the wall $h$ is also an acute angle. The purpose of this formation is to cause the outer portions of the lips $e$ and $k$ to press firmly and constantly on the outer portion of the ring $b$, such ring having its opposite faces parallel to each other and perpendicular to its axis. In forcing the washer and disk together their convergently inclined lips are spread apart by the resistance of the interposed ring, being thereby put under stress which causes such lips to exert a constant pressure against the opposite faces of the ring and making it unnecessary to apply binding means of any sort at the rim of the completed machine element. I have found that it is sufficient to accomplish the result described if the angles $o$ and $p$ are each approximately 85°, that is 5° less than the angle between the adjacent face of the ring $b$ and its axis. Essentially the same result would be secured, however, if the sides of the ring $b$ were made flaring or otherwise than parallel and the values of the angles $o$ and $p$ other than those above described, provided such angles are slightly less than the respectively adjacent angles of the ring $b$.

It is within my contemplation to provide fastening means additional to friction between the washer and disk, in any case where it appears desirable to do so. Such fastening means may be separate inserted pieces, such as rivets, passed through the coaxial walls $f$ and $h$, or may be formed by offsetting or indenting the material of these walls according to well understood mechanical principles. For example, I have shown integral locking tongues $p$ cut from the wall $f$ of the disk and set over against the angle of the washer $c$.

Evidently the mode of construction of the completed article and of the parts thereof hereinbefore described enables the same to be produced and assembled at minimum cost, while the completed article is sufficiently strong and durable.

What I claim and desire to secure by Letters Patent is:

1. A machine element comprising a central member of sound-deadening material, and flanking members of wear-resisting material on opposite sides of said central member, said flanking members both having coaxial offset portions frictionally interengaged with one another in the zone of the sound-deadening material.

2. A machine element comprising a central member of sound-deadening material, and flanking members of wear-resisting material on opposite sides of said central member, one of said flanking members being of sheet or plate metal and having an integral axially displaced offset portion, and the other of said members surrounding and in frictional contact with the major part of said offset portion.

3. A machine element comprising two metal members one of which is a disk having an integral offset web and a cylindrical wall, and the other of which surrounds and is frictionally secured to said wall, said members having lips or flanges arranged with a continuous space of approximately uniform width between them, and a body of sound-deadening material between said lips or flanges.

4. A machine element comprising a washer having its inner part offset at substantially right angles to its outer part, a ring of sound-deadening material fitting about said inner part and at one side against said outer part, and a disk offset at its center to fit friction tight within the inner part of said washer and having a lip bearing against said ring.

5. A machine element comprising a disk of wear-resisting relatively rigid material having its central part offset to provide a web and a wall connecting said web with the peripheral part or rim of the disk, a washer of material having the same properties of which the inner portion is turned out to form an axially extending wall of a size to fit and bear friction tight against one of the surfaces of the wall of said disk, and a ring of sound deadening material surrounding the wall of said washer and confined between the peripheral parts of the disk and washer.

6. A machine element comprising a disk of wear-resisting relatively rigid material having its central part offset to provide a web and a wall connecting said web with the peripheral part or rim of the disk, a washer of material having the same properties of which the inner portion is turned out to form an axially extending wall of a size to fit and bear friction tight against one of the surfaces of the wall of said disk, and a ring of sound-deadening material surrounding the wall of said washer and confined between the peripheral parts of the disk and washer, the peripheral parts of the disk and washer being formed with an initial set or distortion whereby they tend to occupy positions in which the distance between them is less than the thickness of the outer part of said ring.

7. A gear comprising a disk and a washer offset at their inner parts to form coaxial cylindrical walls, one of which surrounds and fits friction tight upon the other and a fiber ring surrounding the wall of one of the aforesaid members and located between the outer or peripheral portions of said members.

8. A gear comprising a disk and a washer offset at their inner parts to form coaxial cylindrical walls, one of which surrounds and fits friction tight upon the other and a fiber ring surrounding the wall of one of the aforesaid members and located between the outer or peripheral portions of said members, the outer portions of said members being distorted or sprung toward one another whereby such portions exert pressure against the opposite sides of the fiber ring adjacent to the outer circumferences thereof.

In testimony whereof I have affixed my signature.

OLOF OHLSON.